(12) United States Patent
Chen et al.

(10) Patent No.: US 8,523,292 B2
(45) Date of Patent: Sep. 3, 2013

(54) BICYCLE HUB ASSEMBLY WHOSE LENGTH IS ADJUSTABLE

(75) Inventors: Ching-Shu Chen, Changhua (TW); Wu-Hsiung Liao, Taichung (TW)

(73) Assignee: Chosen Co., Ltd., Changhua (TW)

( * ) Notice: Subject to any disclaimer, the term of this patent is extended or adjusted under 35 U.S.C. 154(b) by 184 days.

(21) Appl. No.: 12/917,516

(22) Filed: Nov. 2, 2010

(65) Prior Publication Data
US 2012/0104838 A1 May 3, 2012

(51) Int. Cl.
*B60B 27/02* (2006.01)

(52) U.S. Cl.
USPC ................................................ 301/110.5

(58) Field of Classification Search
USPC ............... 301/105.1, 105.5, 105.6; 384/519, 384/545
See application file for complete search history.

(56) References Cited

U.S. PATENT DOCUMENTS

| | | | |
|---|---|---|---|
| 4,651,590 A * | 3/1987 | Thun | 74/594.1 |
| 6,669,306 B1 * | 12/2003 | Hara et al. | 301/110.5 |
| 7,059,686 B2 * | 6/2006 | Kanehisa | 301/110.5 |
| 2002/0017819 A1 * | 2/2002 | Chen | 301/110.5 |

* cited by examiner

*Primary Examiner* — S. Joseph Morano
*Assistant Examiner* — Jean Charleston
(74) *Attorney, Agent, or Firm* — Che-Yang Chen; Law Office of Michael Chen

(57) ABSTRACT

A hub assembly for a bicycle includes a shaft, a hub body rotatably mounted on the shaft, a drive seat rotatably mounted on the shaft and engaging the hub body, a first bearing located between the shaft and the hub body, a second bearing located between the shaft and the hub body, and a bushing unit located between the first bearing and the second bearing. The bushing unit includes a first adjusting sleeve and a second adjusting sleeve. The first adjusting sleeve has a first end provided with an outer threaded portion and a second end abutting the first bearing. The second adjusting sleeve has a first end provided with an inner threaded portion screwed onto the outer threaded portion of the first adjusting sleeve and a second end abutting the second bearing.

4 Claims, 9 Drawing Sheets

BICYCLE HUB ASSEMBLY WHOSE LENGTH IS ADJUSTABLE

BACKGROUND OF THE INVENTION

1. Field of the Invention

The present invention relates to a hub assembly and, more particularly, to a hub assembly for a bicycle.

2. Description of the Related Art

A conventional hub assembly for a bicycle in accordance with the prior art shown in FIGS. 7-9 comprises a shaft 50, a hub body 30 rotatably mounted on the shaft 50, a first bearing 32 mounted in the hub body 30 and located between the shaft 50 and the hub body 30, a second bearing 33 mounted in the hub body 30 and located between the shaft 50 and the hub body 30, and a bushing unit 40 mounted on the shaft 50 and located between the first bearing 32 and the second bearing 33. The hub body 30 has an inner portion provided with a receiving space 31 to receive the first bearing 32, the bushing unit 40 and the second bearing 33. The bushing unit 40 is received in the receiving space 31 of the hub body 30 and includes a first adjusting sleeve 41 and a second adjusting sleeve 42 connected with the first adjusting sleeve 41. The first adjusting sleeve 41 of the bushing unit 40 has a first end provided with a socket portion 411 and a second end abutting the first bearing 32. The second adjusting sleeve 42 of the bushing unit 40 has a first end provided with a plug portion 421 inserted into the socket portion 411 of the first adjusting sleeve 41 and a second end abutting the second bearing 33. Thus, the second adjusting sleeve 42 is moved axially relative to the first adjusting sleeve 41 so that the length of the bushing unit 40 can be adjusted to fit that of the hub body 30. However, the second adjusting sleeve 42 is loosely fitted into the first adjusting sleeve 41 so that the second adjusting sleeve 42 is easily moved relative to the first adjusting sleeve 41 due to compression, and the bushing unit 40 will thus be retracted, thereby easily causing deflection or slip of the first bearing 32 and the second bearing 33.

BRIEF SUMMARY OF THE INVENTION

In accordance with the present invention, there is provided a hub assembly for a bicycle, comprising a shaft, a hub body rotatably mounted on the shaft, a drive seat rotatably mounted on the shaft and engaging the hub body, a first bearing mounted in the hub body and located between the shaft and the hub body, a second bearing mounted in the hub body and located between the shaft and the hub body, and a bushing unit mounted on the shaft and located between the first bearing and the second bearing. The bushing unit includes a first adjusting sleeve and a second adjusting sleeve adjustably connected with the first adjusting sleeve. The first adjusting sleeve of the bushing unit has a first end provided with an outer threaded portion and a second end abutting the first bearing. The second adjusting sleeve of the bushing unit has a first end provided with an inner threaded portion screwed onto the outer threaded portion of the first adjusting sleeve and a second end abutting the second bearing.

The primary objective of the present invention is to provide a bicycle hub assembly whose length is adjustable.

According to the primary advantage of the present invention, the first adjusting sleeve is rotated and moved axially relative to the second adjusting sleeve to adjust the length of the bushing unit so that the length of the bushing unit is adjustable to fit the hub body of different length.

According to another advantage of the present invention, the inner threaded portion of the second adjusting sleeve is screwed onto the outer threaded portion of the first adjusting sleeve so that the second adjusting sleeve is combined with the first adjusting sleeve without producing displacement between the second adjusting sleeve is combined with the first adjusting sleeve.

According to a further advantage of the present invention, the bushing unit is located between the first bearing and the second bearing and will not be retracted due to compression so that the first bearing and the second bearing are limited and supported by the bushing unit solidly and stably to prevent the first bearing and the second bearing from producing deflection or slip.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
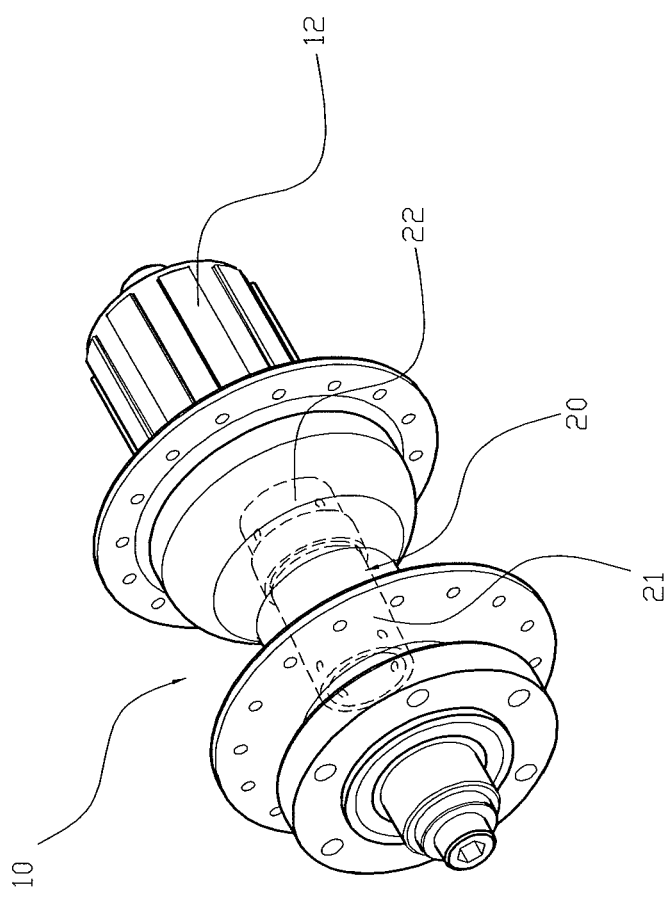
FIG. 1 is a perspective view of a hub assembly for a bicycle in accordance with the preferred embodiment of the present invention.

Referring to the drawings and initially to FIGS. 1-4, a hub assembly for a bicycle in accordance with the preferred embodiment of the present invention comprises a shaft 15, a hub body 10 rotatably mounted on the shaft 15, a drive seat 12 rotatably mounted on the shaft 15 and engaging the hub body 10, a first bearing 13 mounted in the hub body 10 and located between the shaft 15 and the hub body 10, a second bearing 14 mounted in the hub body 10 and located between the shaft 15 and the hub body 10, and a bushing unit 20 mounted on the shaft 15 and located between the first bearing 13 and the second bearing 14.

The hub body 10 has an inner portion provided with a receiving space 11. The hub body 10 has a first end provided with a first mounting portion 111 connected to the receiving space 11 for mounting the first bearing 13 and a second end provided with a second mounting portion 112 connected to the receiving space 11 for mounting the second bearing 14. The first mounting portion 111 of the hub body 10 has an inner wall provided with a first abutment 113 abutting the first bearing 13. The second mounting portion 112 of the hub body 10 has an inner wall provided with a second abutment 114 abutting the second bearing 14.

The bushing unit 20 is received in the receiving space 11 of the hub body 10 and includes a first adjusting sleeve 21 and a second adjusting sleeve 22 adjustably connected with the first adjusting sleeve 21.

The first adjusting sleeve 21 of the bushing unit 20 has a first end provided with an outer threaded portion 211 and a second end 213 abutting the first bearing 13. The first adjusting sleeve 21 of the bushing unit 20 has a peripheral wall provided with a plurality of first adjusting holes 212. The first adjusting holes 212 of the first adjusting sleeve 21 are located at the second end 213 of the first adjusting sleeve 21.

The second adjusting sleeve 22 of the bushing unit 20 has a first end provided with an inner threaded portion 221 screwed onto the outer threaded portion 211 of the first adjusting sleeve 21 and a second end 223 abutting the second bearing 14. The second adjusting sleeve 22 of the bushing unit 20 has a peripheral wall provided with a plurality of second adjusting holes 222. The second adjusting holes 222 of the second adjusting sleeve 22 are located at the second end 223 of the second adjusting sleeve 22. The second adjusting sleeve 22 of the bushing unit 20 has an inner wall provided with a stepped stop flange 220 to stop the outer threaded portion 211 of the first adjusting sleeve 21.

Figure 2:
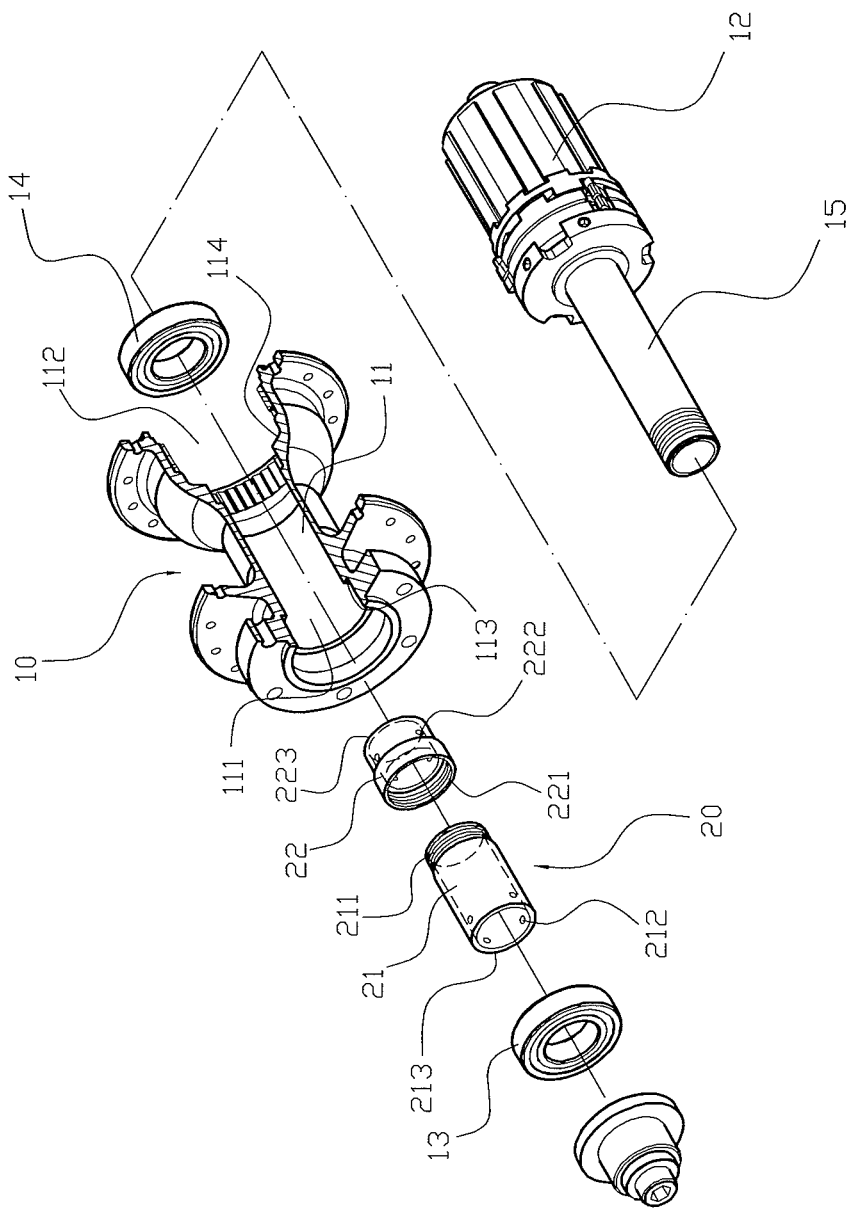
FIG. 2 is an exploded perspective view of the hub assembly for a bicycle as shown in FIG. 1.
Figure 3:
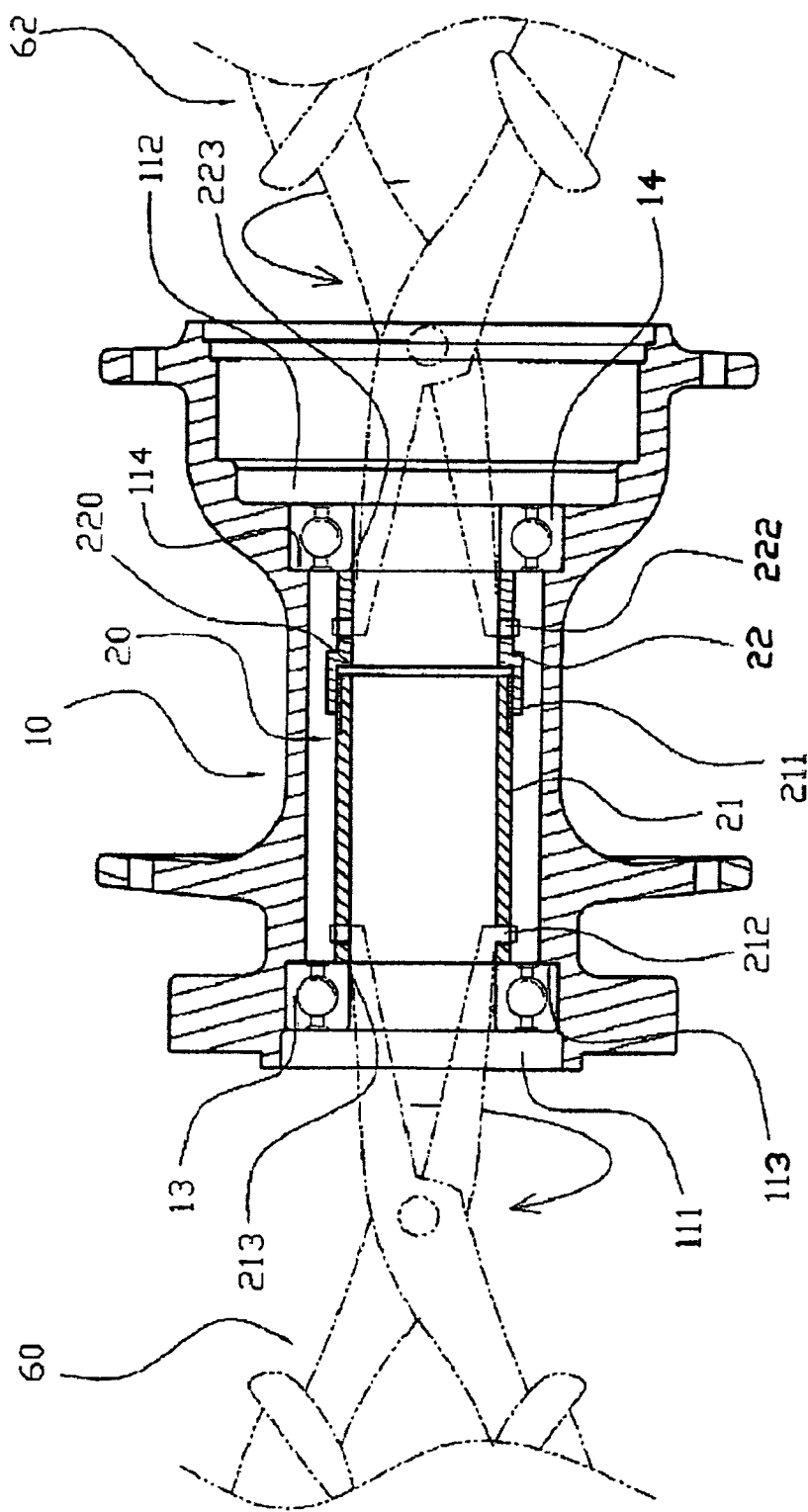
FIG. 3 is a front cross-sectional operational view of the hub assembly for a bicycle as shown in FIG. 1.
Figure 4:
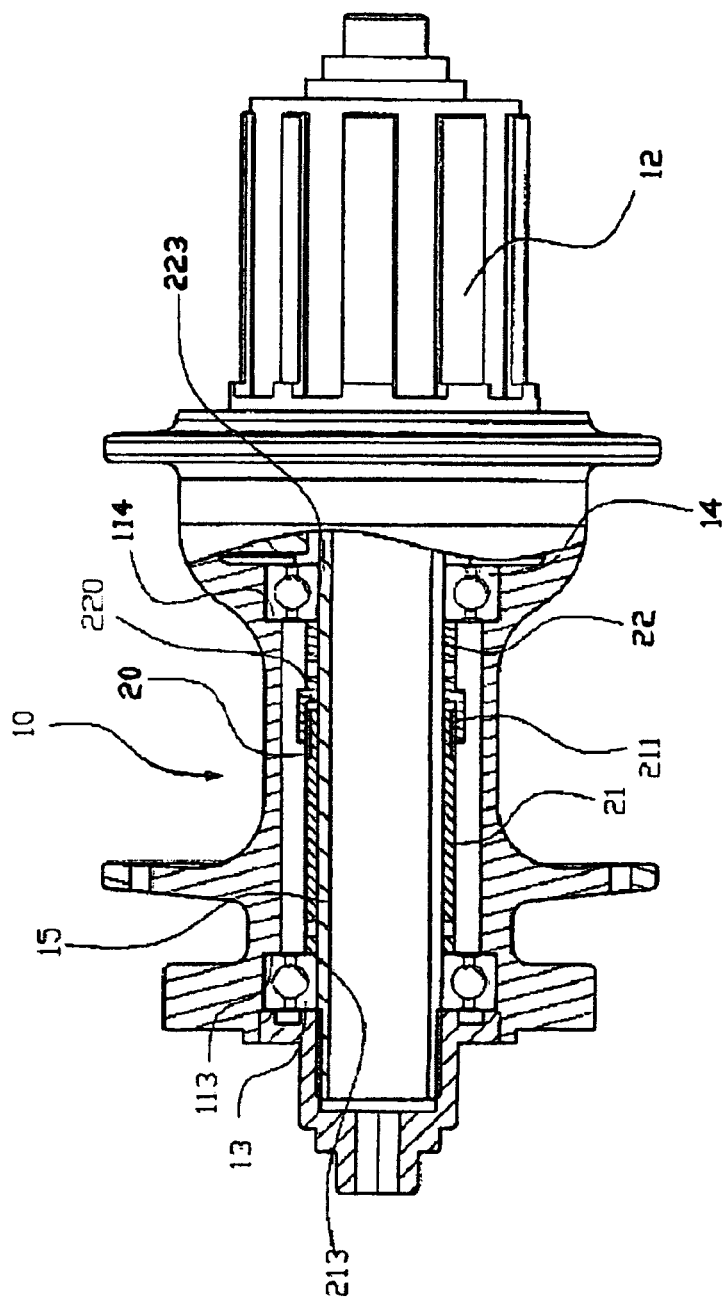
FIG. 4 is a front cross-sectional view of the hub assembly for a bicycle as shown in FIG. 1.

In assembly, referring to FIGS. 3 and 4 with reference to FIGS. 1 and 2, the first bearing 13 is received in the first mounting portion 111 of the hub body 10 and abuts the first abutment 113 of the first mounting portion 111. Then, the bushing unit 20 is inserted into the receiving space 11 of the hub body 10 and abuts the first bearing 13. Then, the second bearing 14 is received in the second mounting portion 112 of the hub body 10 and abuts the second abutment 114 of the second mounting portion 112 and the bushing unit 20. Then, a first hand tool 60 is inserted through the first mounting portion 111 of the hub body 10 into the first adjusting holes 212 of the first adjusting sleeve 21, and a second hand tool 62 is inserted through the second mounting portion 112 of the hub body 10 into the second adjusting holes 222 of the second adjusting sleeve 22. Then, the first hand tool 60 and the second hand tool 62 are rotated in different directions so that the first adjusting sleeve 21 is rotated relative to the second adjusting sleeve 22 as shown in FIG. 3. At this time, the inner threaded portion 221 of the second adjusting sleeve 22 is screwed onto the outer threaded portion 211 of the first adjusting sleeve 21 so that when the first adjusting sleeve 21 is rotated relative to the second adjusting sleeve 22, the first adjusting sleeve 21 and the second adjusting sleeve 22 are moved outward relative to each other to press the first bearing 13 and the second bearing 14 respectively. In such a manner, the first adjusting sleeve 21 is rotated and moved axially relative to the second adjusting sleeve 22 to adjust the length of the bushing unit 20 so that the length of the bushing unit 20 is adjustable to fit the length of the hub body 10. Then, the shaft 15 is inserted through the second mounting portion 112 of the hub body 10, the second bearing 14, the bushing unit 20, the first bearing 13 and the first mounting portion 111 of the hub body 10 as shown in FIG. 4, and the drive seat 12 engages the hub body 10 to construct the hub assembly as shown in FIG. 1.

When in use, the hub body 10 is connected to a wheel (not shown) of the bicycle, the shaft 15 is connected to the rear stays (not shown) of a frame (not shown) of the bicycle, and a freewheel on the drive seat 12 meshes with and is driven by a chain (not shown) which is driven by a chainwheel (not shown) which is driven by a pedal (not shown) that is pedaled by a rider.

Figure 5:
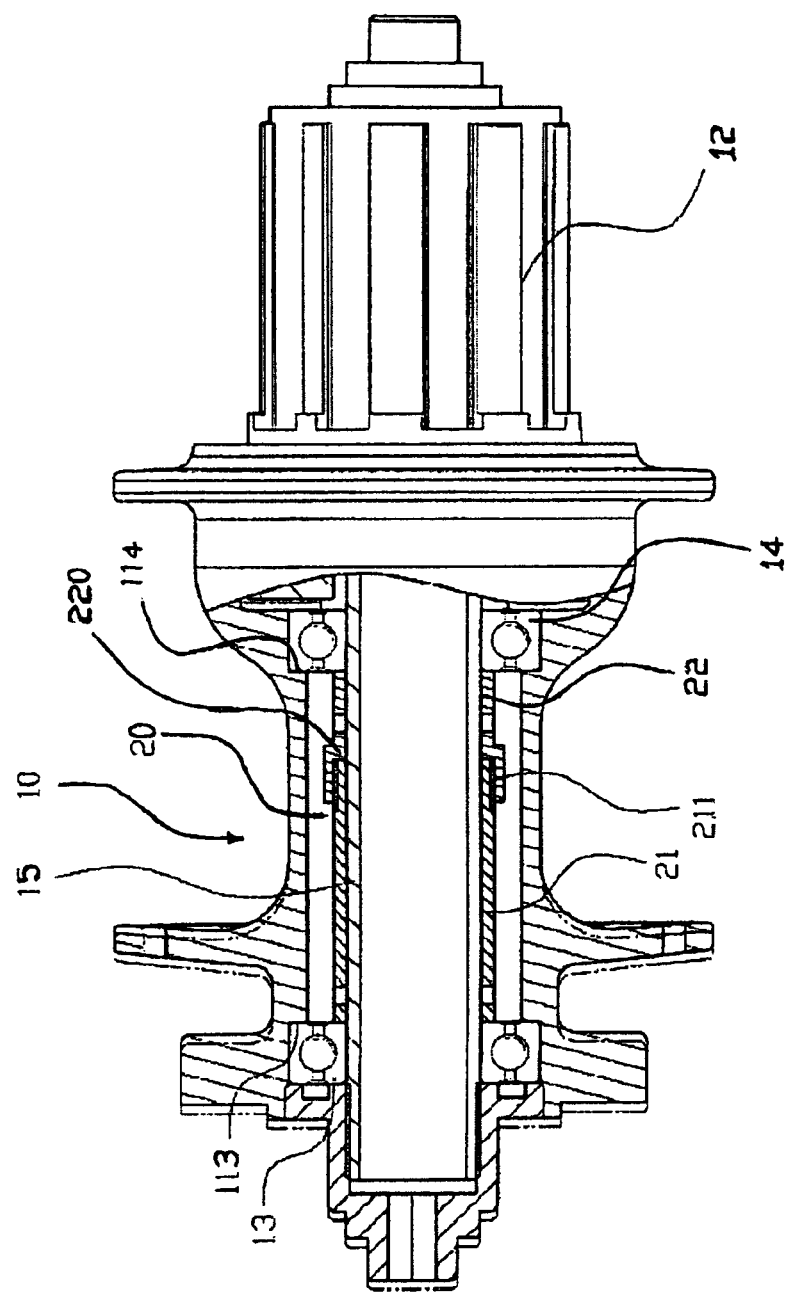
FIG. 5 is a schematic operational view of the hub assembly for a bicycle as shown in FIG. 4.

As shown in FIG. 5, the length of the bushing unit 20 is adjustable to fit the hub body 10 having a different length.

Figure 6:
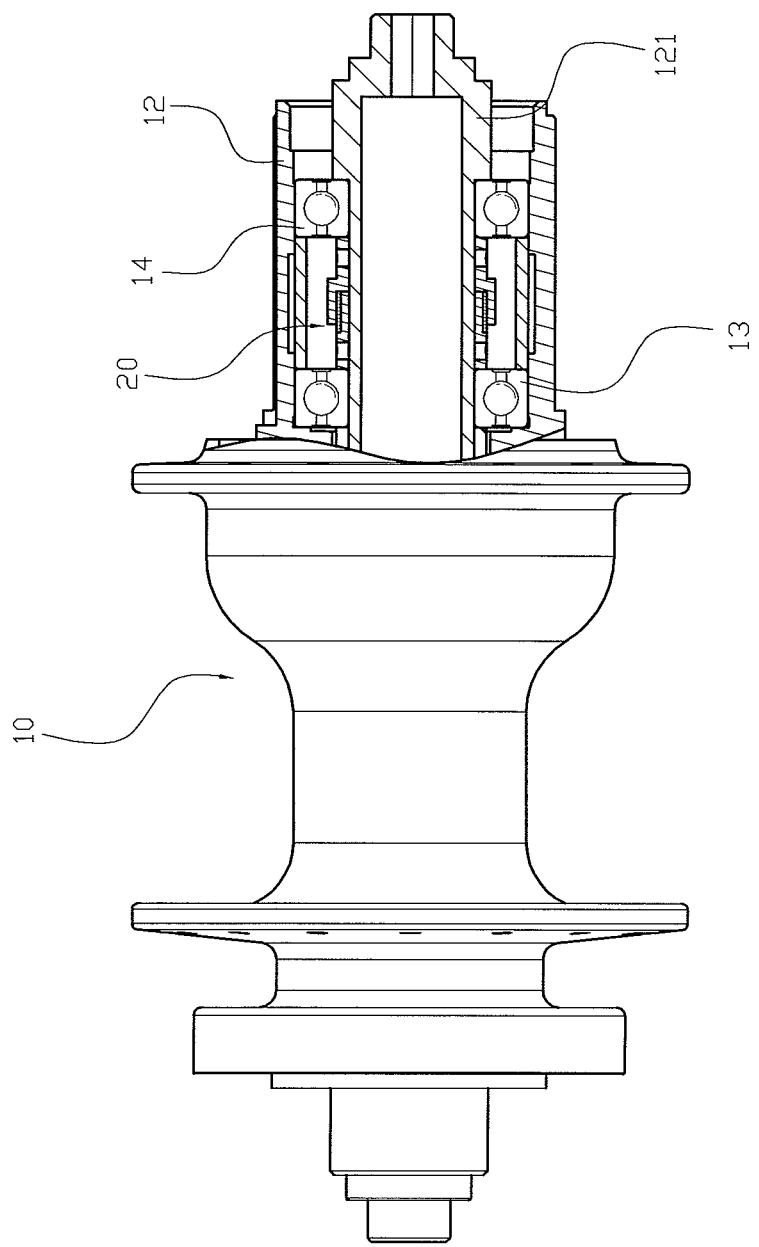
FIG. 6 is a front cross-sectional view of a hub assembly for a bicycle in accordance with another preferred embodiment of the present invention.
Figure 7:
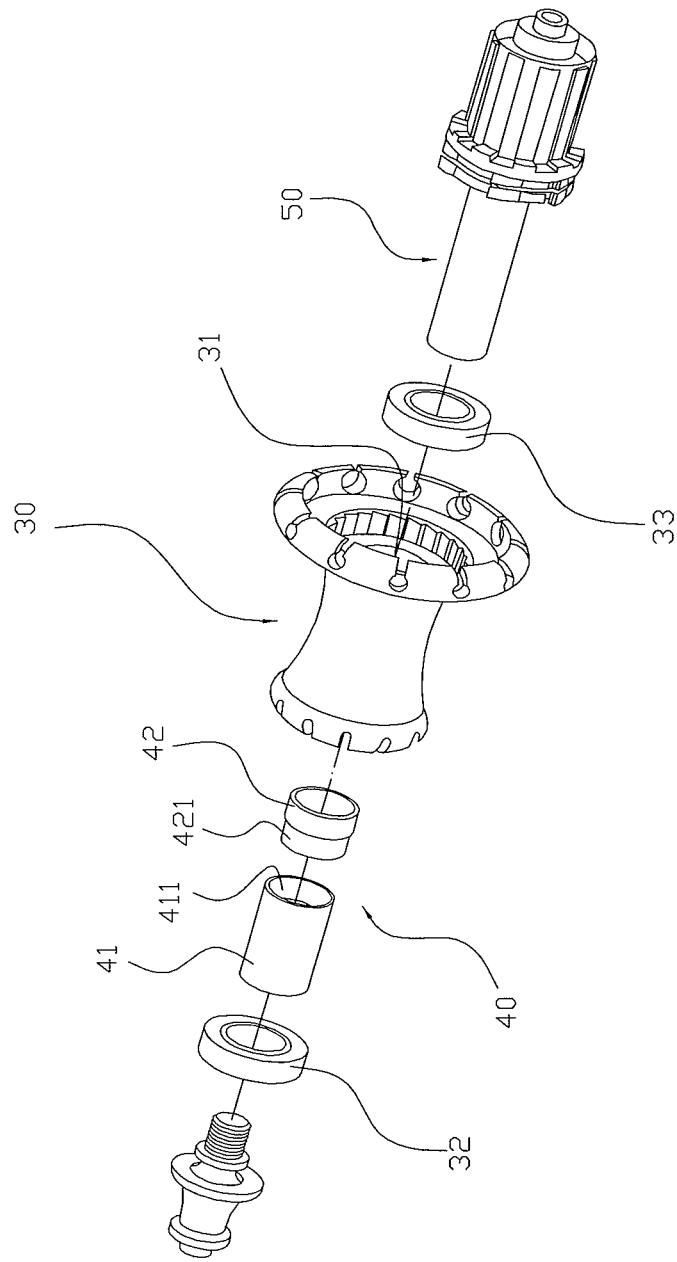
FIG. 7 is an exploded perspective view of a conventional hub assembly for a bicycle in accordance with the prior art.
Figure 8:
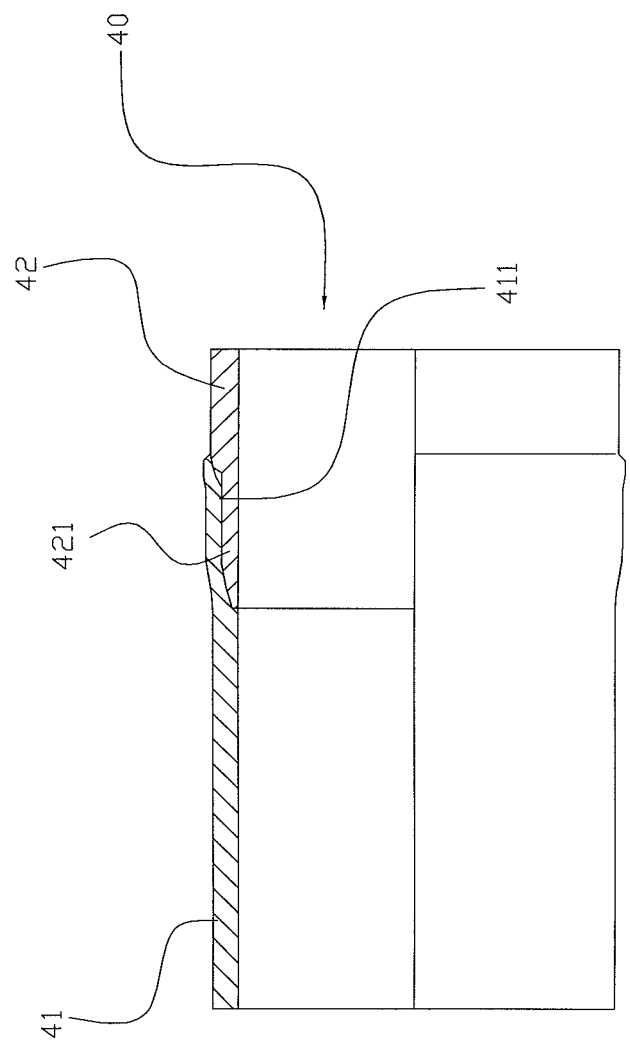
FIG. 8 is a partially front cross-sectional assembly view of the conventional hub assembly for a bicycle as shown in FIG. 7.
Figure 9:
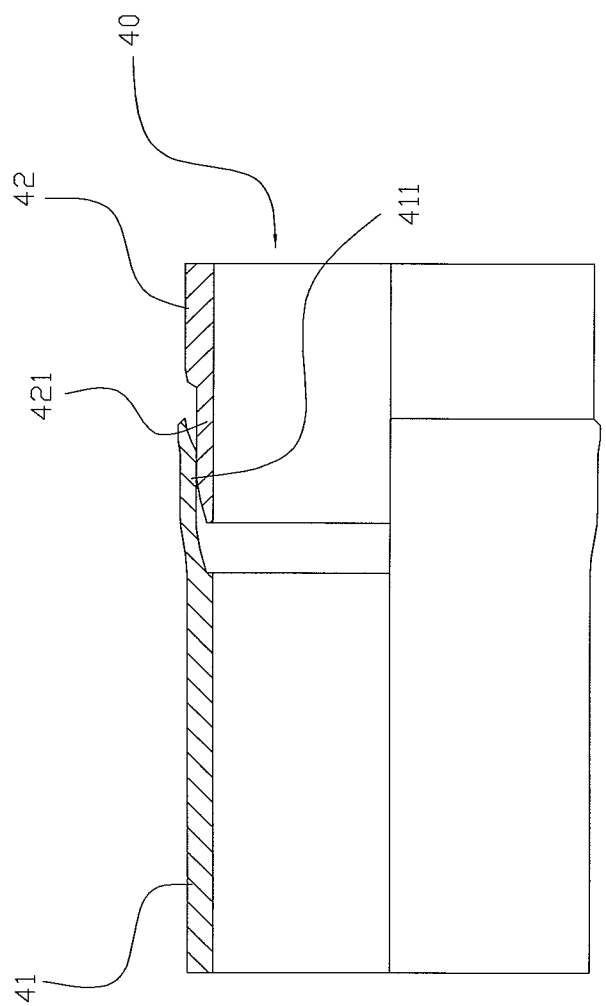
FIG. 9 is a schematic operational view of the conventional hub assembly for a bicycle as shown in FIG. 8.

As shown in FIG. 6, the bushing unit 20 is mounted in the drive seat 12 and is located beside the hub body 10.

Accordingly, the first adjusting sleeve 21 is rotated and moved axially relative to the second adjusting sleeve 22 to adjust the length of the bushing unit 20 so that the length of the bushing unit 20 is adjustable to fit the hub body 10 of different length. In addition, the inner threaded portion 221 of the second adjusting sleeve 22 is screwed onto the outer threaded portion 211 of the first adjusting sleeve 21 so that the second adjusting sleeve 22 is combined with the first adjusting sleeve 21 without producing displacement between the second adjusting sleeve 22 is combined with the first adjusting sleeve 21. Further, the bushing unit 20 is located between the first bearing 13 and the second bearing 14 and will not be retracted due to compression so that the first bearing 13 and the second bearing 14 are limited and supported by the bushing unit 20 solidly and stably to prevent the first bearing 13 and the second bearing 14 from producing deflection or slip.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub assembly for a bicycle comprising:
a shaft;
a hub body rotatably mounted on the shaft;
a drive seat rotatably mounted on the shaft and engaging the hub body;
a first bearing mounted in the hub body and located between the shaft and the hub body;
a second bearing mounted in the hub body and located between the shaft and the hub body; and
a bushing unit mounted on the shaft and located between the first bearing and the second bearing;
wherein the bushing unit includes:
a first adjusting sleeve; and
a second adjusting sleeve adjustably connected with the first adjusting sleeve;
wherein the first adjusting sleeve of the bushing unit has a first end provided with an outer threaded portion and a second end abutting the first bearing;
wherein the second adjusting sleeve of the bushing unit has a first end provided with an inner threaded portion screwed onto the outer threaded portion of the first adjusting sleeve and a second end abutting the second bearing, wherein:
the first adjusting sleeve of the bushing unit has a peripheral wall provided with a plurality of first adjusting holes;
the first adjusting holes of the first adjusting sleeve are located at the second end of the first adjusting sleeve;
the second adjusting sleeve of the bushing unit has a peripheral wall provided with a plurality of second adjusting holes; and
the second adjusting holes of the second adjusting sleeve are located at the second end of the second adjusting sleeve.

2. The hub assembly for a bicycle of claim 1, wherein the second adjusting sleeve of the bushing unit has an inner wall provided with a stepped stop flange to stop the outer threaded portion of the first adjusting sleeve.

3. The hub assembly for a bicycle of claim 1, wherein:
the hub body has an inner portion provided with a receiving space;

the hub body has a first end provided with a first mounting portion connected to the receiving space for mounting the first bearing and a second end provided with a second mounting portion connected to the receiving space for mounting the second bearing;

the first mounting portion of the hub body has an inner wall provided with a first abutment abutting the first bearing;

the second mounting portion of the hub body has an inner wall provided with a second abutment abutting the second bearing; and the bushing unit is received in the receiving space of the hub body.

4. The hub assembly for a bicycle of claim 1, wherein the bushing unit is mounted in the drive seat and is located beside the hub body.

* * * * *